United States Patent [19]

Sorensen

[11] 4,176,876
[45] Dec. 4, 1979

[54] WIND DEFLECTOR

[75] Inventor: Norman L. Sorensen, Detroit, Mich.

[73] Assignee: Wisco Corporation, Ferndale, Mich.

[21] Appl. No.: 831,643

[22] Filed: Sep. 8, 1977

Related U.S. Application Data

[63] Continuation-in-part of Ser. No. 820,105, Jul. 29, 1977.

[51] Int. Cl.² ............................................. B60T 7/22
[52] U.S. Cl. ............................................. 296/137 J
[58] Field of Search .......... 296/137 R, 137 B, 137 E, 296/137 J; 49/394; 98/2.14; 292/DIG. 49, DIG. 5

[56] References Cited

U.S. PATENT DOCUMENTS

| 4,067,604 | 1/1978 | Mori | 296/137 J |
| 4,067,605 | 1/1978 | Green et al. | 296/137 B |

Primary Examiner—Joseph F. Peters, Jr.
Assistant Examiner—Gene A. Church
Attorney, Agent, or Firm—Basile and Weintraub

[57] ABSTRACT

A vehicle of the type having an opening in its roof on which a molding is formed around the perimeter of the opening. The molding includes a rigid section and a resilient element carried thereby. The rigid section is attached to and supported on the roof at the perimeter of the opening and extends into the opening and about the perimeter underlying a resilient element so as to support the resilient element against motion in a direction toward the interior of the vehicle. At the forward end of the vehicle opening a wind deflector is mounted to the rigid section of the molding. This is accomplished by means of a bayonet member and a retainer member carried on the lower side of the wind deflector with their outer extending ends being in opposing relationship and adapted to engage the upper and lower surfaces of the rigid section of the molding so as to releasably secure the wind deflector thereto.

5 Claims, 6 Drawing Figures

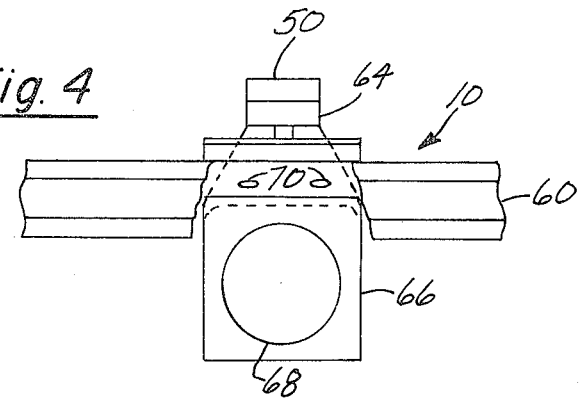
Fig. 4
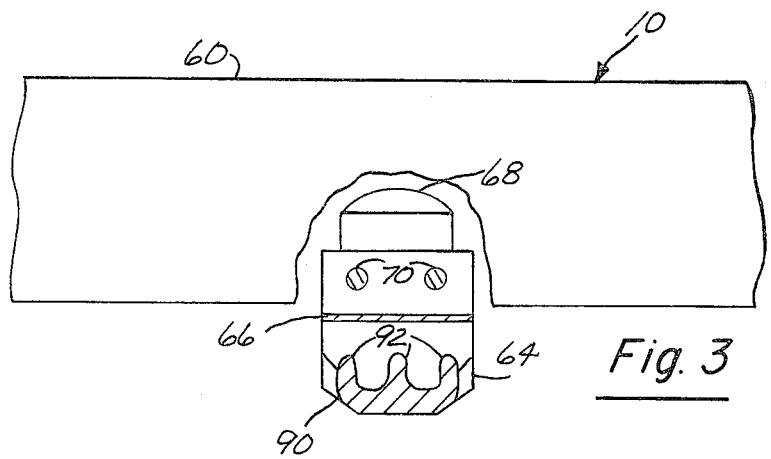
Fig. 3
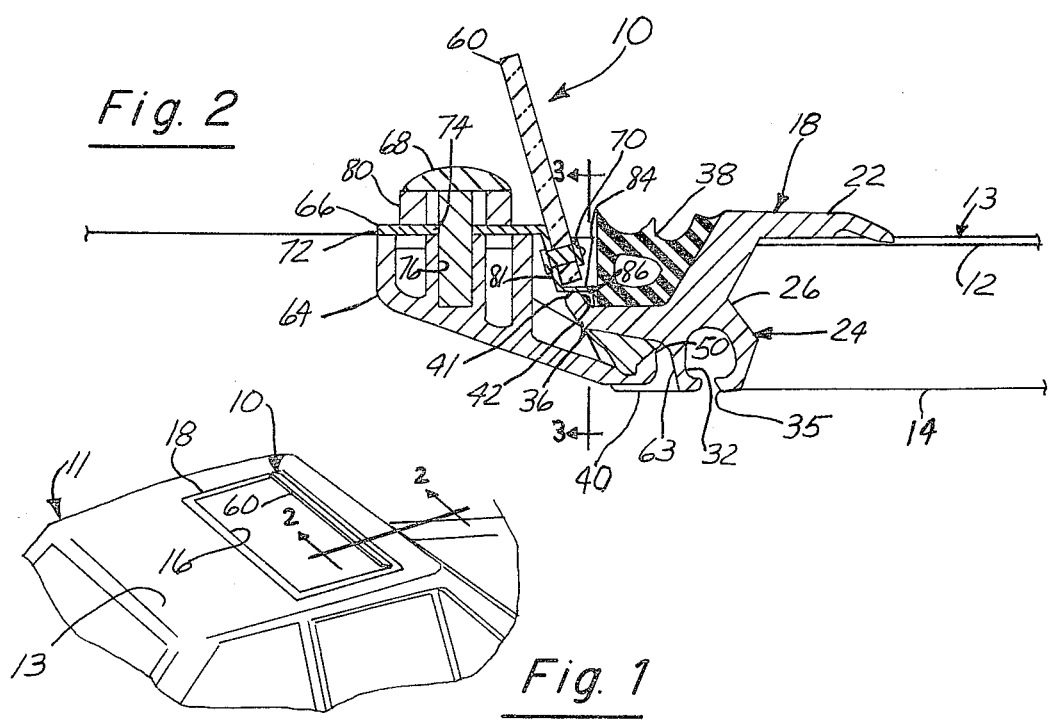
Fig. 2
Fig. 1

WIND DEFLECTOR

CROSS REFERENCE TO RELATED APPLICATIONS

The present application is a continuation-in-part application of co-pending U.S. Pat. application Ser. No. 820,105 filed July 29, 1977, and entitled "SUNROOF STRUCTURE" and the same is incorporated herein by reference.

BACKGROUND OF THE INVENTION

I. Field of the Invention

The present invention relates to a removable wind deflector for a vehicle roof of the type provided with a removable sunroof panel such that the deflector may be attached to the forward portion of the vehicle roof at the sunroof opening after the sunroof has been removed from the vehicle.

Prior Art

The aforementioned United States patent application discloses an opening in a vehicle roof adapted to receive a removable, transparent sunroof panel. The panel is retained in the frame opening by a pair of bayonets which project from the underside of the panel on the forward edge thereof and cooperate with the adjacent panel edge to engage the frame. This sunroof panel further includes a fastening device which adapts the rearward edge of the panel to be secured to the vehicle roof, in one position, and, in a second position, permits the panel to be raised; and a third position permits the panel to be completely removed from the vehicle roof. The present invention has particular application to such sunroofs and is adapted to be mounted to the forward edge of the sunroof frame when the sunroof panel has been removed from the vehicle roof. Examples of known sunroof structures which are relevant to applicant's invention are disclosed in U.S. Pat. Nos. 3,913,971; 3,955,848; and 3,537,212; and West German Patentenneldung-V7038V/68B. These patents are relevant to the extent that they were cited in a patent application for a similar sunroof, Ser. No. 583,260 filed June 3, 1975, and entitled "DETACHABLE SUNROOF PANEL FOR AUTOMOBILES."

Applicant is not aware of any relevant prior art with respect to sunroofs having removable wind deflectors.

III. Prior Art Statement

The prior art listed hereinbefore includes, in the opinion of applicant, the closest prior art of which applicant is aware.

SUMMARY OF THE INVENTION

The present invention, which will be described subsequently in greater detail, comprises a wind deflector for vehicles having a roof with a central opening into which a sunroof is removably mounted. The opening includes a molding having a rigid section which functions to mount the sunroof panel and, after its removal, releasably secures the wind deflector to the vehicle roof.

It is therefore a primary object of the present invention to provide a new and improved wind deflector which is removably mounted to a vehicle roof of the type having a central opening for the mounting of a sunroof panel.

It is a further object of the present invention to provide a new and improved wind deflector havving a novel means for attaching it to a vehicle roof.

It is a further object of the present invention to provide a new and improved wind deflector which is relatively simple in construction, yet one which is of low cost, reliable and easily used.

Other objects, advantages and applications of the present invention will become apparent to those skilled in the art of wind deflectors for vehicle roofs when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and wherein:

FIG. 1 is a fragmentary, perspective view of a vehicle, such as an automobile, incorporating a wind deflector made in accordance with the principles of the present invention with the wind deflector being illustrated as being attached to a central opening within the vehicle roof;

FIG. 2 is an enlarged, cross-sectional view through the wind deflector and vehicle roof taken along Line 2—2 of FIG. 1 showing the wind deflector being attached to the forward edge of the vehicle roof opening;

FIG. 3 is a fragmentary, partially sectioned view of the wind deflector and one of its mounting elements taken along Line 3—3 of FIG. 2; and FIG. 4 is a fragmentary, top plan view of the wind deflector illustrated in FIGS. 1 through 3 of the drawing.

DESCRIPTION OF THE PREFERRED EMBODIMENT

Referring now to the drawing, and in particular to FIG. 1, wherein there is illustrated one example of the present invention in the form of a wind deflector 10 carried by an automobile 11, although it should be understood by those skilled in the art of wind deflectors that the inventive wind deflector 10 has application to a variety of vehicles, such as trucks, vans, and the like.

The roof 13 of the automobile 11 is typically formed of an outer metal sheet 12 and a fabric headliner 14 (FIG. 2) disposed under the roof sheet 12 and spaced inwardly therefrom. In the present embodiment the vehicle 11 has a sunroof opening 16 formed in the roof 13 in a position which is generally above the front seat of the vehicle 11. The perimeter of this opening 16 is finished with a frame 18 (FIG. 2). The frame 18 is adapted to removably secure a sunroof panel, preferably formed of a sheet of shatter-proof, tempered, tinted glass and having a dimension complementary to the opening 16. While the sunroof panel is not disclosed, it is amply illustrated and described in the aforementioned co-pending U.S. Pat. application Ser. No. 820,105.

The frame 18 may be formed of an extruded aluminum bent into a closed section adapted to fit the roof opening 16 and having its ends joined by an appropriate fastening method, such as rivets or welding. As can best be seen in FIG. 2, the frame 18 includes an extending section 22 which overlies the top of the roof 13 at the opening 16. A downwardly extending section 24 of the frame 18 has a surface 26 which is inclined under the extending section 22 to form a pair of opposed, tapered surfaces which are adapted to receive tapered wedges, described in the aforementioned application, which abut the underside of the perimeter of the roof sheet 12 so as to secure the frame 18 to the roof 13. The downwardly extending section 24 of the frame 18 contains a downwardly extending groove 32 which, in turn, receives a plastic molding (not shown) that conceals the edge 35 of the fabric headliner 14. The headliner 14 stops short of the groove 32 and is attached to the underside of the section 24 by any suitable means, such as an adhesive.

The frame 18 includes a section 36 which is cantilevered into the opening 16 in the plane of the roof 13 and supports a resilient molding 38 on its upper surface so as to support the resilient molding 38 against motion in a direction toward the interior of the vehicle 11. The innermost end of the cantilevered section 36 is bent upwardly at 41 and defines a raised section of the cantilevered section 36 which is spaced from the inside surface of the resilient molding 38 to define a groove 42.

At two spaced points along the forward edge of the opening 16, bayonet support members 40 are attached to the lower side of the frame cantilevered section 36. The support members 40 are shaped to cooperate with the frame 18 so as to define thereinbetween a pair of recesses 63 which are adapted to cooperate with a pair of extending bayonet members that are affixed to the underside of the aforementioned sunroof panel at two spaced points on its forward edge. The bayonets carried by the sunroof panel are amply described in the aforementioned patent application. It should suffice here to say that the bayonet support members 40 provide the dual function of supporting the sunroof panel and the inventive wind deflector 10.

As can best be seen in the several figures, the wind deflector 10 comprises an elongated, aluminum deflector member 60 which is carried at the forward edge of the opening 16 and is affixed to the frame 18 in a manner which will be described hereinafter, such that the deflector member 60 extends from the cantilevered section 36 upwardly and rearwardly therefrom to a position above the roof 13 of the automobile 11. The deflector member 60 is approximately two inches in height and is supported by a pair of extending bayonet members 64 affixed to the back side thereof in a manner to be described hereinafter at two spaced points along the length of the deflector member 60 which corresponds to the distance between the bayonet support members 40 carried by the underside of the cantilevered section 36 at the forward edge of the opening 16. While only one bayonet 64 is illustrated, it should be understood that the description of one is equally applicable to the second bayonet 64.

As can best be seen in FIG. 2, 3 and 4, the bayonets 64 are secured to the deflector member 60 by means of a retainer plate 66, a bolt 68 and rivets 70. The retainer plate 66 has a bayonet engaging portion 72 with a central aperture 74 that is alignable with a threaded bore 76 in the upper portions of the bayonet 64, such that the bolt 68 extends through a spacer member 80 and the retainer aperture 74 and into threaded engagement with the threaded bore 76 so as to securely attach the retainer 66 to the upper support surface of the bayonet 64. The retainer plate 66 includes an inclined section 81 on which the lower portion of the deflector member 60 abuts and onto which it is securely attached by means of the rivet 70 that extends through aligned apertures (unnumbered) in both the deflector member 60 and the inclined section 81 of the retainer plate 66. The retainer plate 66 includes a supporting section 84 and a second inclined support end 86. As can best be seen in FIG. 2 of the drawing, when the wind deflector is positioned in a manner to be described hereinafter, the support section 84 abuts and is supported by the bent end 41 of the cantilevered section 36 while the support end 86 of the retainer plate 66 is in abutment with the upper surface of the cantilevered section 36 and is snugly pressed against the inside surface of the resilient element 38.

The inner ends of the bayonets 64 project past the lower end of the deflector member 60 and downwardly at a slightly inclined angle away from the deflector member 60. The ends of the bayonets 64 have upwardly right-angled, bent extreme end sections 50 which, in a manner similar to the bayonets described in the aforementioned co-pending United States patent application, are received by the support member recesses 63. When the wind deflector 10 is mounted to the frame 18 in the position shown, the retainer plate end 86 is first positioned against the upper surface of the cantilevered section 36 and the entire wind deflector 10 is rotated counterclockwise. The upper edges of the bayonet section 50 press against the lower edge of the bayonet support member 40 and pull the wind deflector to the position shown such that the support surface 81 is in abutment with and is supported by the angled end 41 of the cantilevered section and the inclined retainer plate end 86 of the retainer plate 66 is pressed against the resilient element 38, all of which functions to securely attach the wind deflector 10 to the forward edge of the opening 16. In this position the extending end sections 50 of the bayonet 64 cannot be removed from the recesses 63, and the wind deflector 10 is securely attached to the vehicle roof 13.

As can best be seen in FIG. 1, the wind deflector 10 has a length which corresponds generally to the width of the opening 16 so that it extends completely across the forward edge of the opening 16 to deflect the air over the opening such that the air movement is not directly into the opening 16 when the vehicle is in motion.

As can best be seen in FIG. 3, the bayonet 64 has an arm member 90 which includes a plurality of longitudinally and laterally spaced rib members 92 which function to provide both strength and rigidity to the bayonet 64 so that any forces that are exerted against the deflector member 60 are suitably absorbed thereby and transmitted to the frame 18. The removal of the wind deflector 10 is facilitated merely by rotating the entire assembly about the point of engagement of the inclined retainer end 86 and the upper surface of the cantilevered section 36 until the bayonet end 50 clears the recess 63, whereupon the entire wind deflector 10 may be removed from the automobile.

Although only one form of applicant's invention has been disclosed, it should be understood by those skilled in the art of wind deflectors for removable sunroofs that other forms of applicant's invention may be had, all coming within the spirit of the invention and the scope of the appended claims.

What is claimed is as follows:

1. A wind deflector for a vehicle of the type having a roof with a central opening formed therein and a frame formed around the perimeter of the opening including a rigid section attached to and supported by the roof at the perimeter of the opening and extending into the opening, said wind deflector comprising:

an elongated member adapted to be manually positioned on said frame to extend upwardly from said frame above said vehicle roof and across said opening adjacent the forward edge of said opening; and means carried by said member for the releasable attachment of said member to said rigid section for manually attaching and removing said wind deflector to said frame.

2. The wind deflector defined in claim 1 wherein said rigid section has an upper surface and a lower surface and said wind deflector further comprises:

a retainer plate having an end portion adapted to engage the upper surface of said rigid section;

a bayonet member having a lower section adapted to engage the lower surface of said rigid section; and means for attaching said bayonet member to said retainer plate, said retainer plate and said bayonet member cooperating with said rigid section for securely and releasably attaching said wind deflector to said frame.

3. The wind deflector defined in claim 2 further comprising:

a resilient element carried by said upper surface of said rigid section such that said rigid section provides an underlying support of the resilient element to support it against motion and direction toward the interior of said vehicle, said rigid section having an upturned end portion engaging the surface of said retainer to provide support for said retainer plate to support said retainer plate against motion in a direction toward the interior of the vehicle, said retainer plate having an end section extending below said upturned end of said rigid section, said resilient element having an inside surface spaced from said upturned end of said rigid section, said retainer plate end section being disposed between said rigid section and said inside surface of said resilient element and engaging said element when said bayonet engages said lower surface of said rigid section to secure the deflector to said frame.

4. The wind deflector defined in claim 2 wherein said retainer plate has an inclined wall surface which mounts said deflector member at a predetermined incline, said bayonet member being mounted to said retainer plate rearwardly of said inclined surface, said bayonet member having a section which extends outwardly in the direction of the lower edge of said deflector member and is adapted to engage said frame at a point below said rigid section.

5. A wind deflector for a vehicle roof, said wind deflector comprising:

an elongated deflector member;

a plurality of longitudinally spaced retainer plates carried by said deflector member, each of said retainer plates having a first section and a second section inclined with respect to said first section, said second section having means for mounting said deflector member thereto, said plates each having a third section for engaging a portion of a vehicle; and a bayonet member carried by the first section of said retainer plate, said bayonet member having an inclined section extending beyond said third section of said retainer and adapted to engage a portion of a vehicle for securely attaching said wind deflector thereto in a releasable fashion.

* * * * *